United States Patent
Selvaraj et al.

(10) Patent No.: US 12,553,021 B2
(45) Date of Patent: Feb. 17, 2026

(54) BIOPROCESSING SYSTEM AND ASSOCIATED METHOD THEREOF

(71) Applicant: GLOBAL LIFE SCIENCES SOLUTIONS USA LLC, Marlborough, MA (US)

(72) Inventors: Shivakumar Selvaraj, Bengaluru (IN); Sahebagouda Alagur, Bengaluru (IN); Sameera Simha Hindupur, Bengaluru (IN); Nityananda Maiya, Bengaluru (IN); Mayank Dadhwal, Bengaluru (IN); Fredrik Lundstrom, Uppsala (SE)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 638 days.

(21) Appl. No.: 17/996,418

(22) PCT Filed: Jun. 24, 2021

(86) PCT No.: PCT/EP2021/067373
§ 371 (c)(1),
(2) Date: Oct. 17, 2022

(87) PCT Pub. No.: WO2021/260126
PCT Pub. Date: Dec. 30, 2021

(65) Prior Publication Data
US 2023/0193188 A1    Jun. 22, 2023

(30) Foreign Application Priority Data
Jun. 26, 2020   (IN)   .......................... 202041027267

(51) Int. Cl.
*C12M 1/36* (2006.01)
*C12M 1/00* (2006.01)
*C12M 1/34* (2006.01)

(52) U.S. Cl.
CPC .......... *C12M 41/48* (2013.01); *C12M 29/04* (2013.01); *C12M 29/10* (2013.01); *C12M 41/36* (2013.01)

(58) Field of Classification Search
CPC ...... C12M 29/04; C12M 29/10; C12M 41/36; C12M 41/48
See application file for complete search history.

(56) References Cited

U.S. PATENT DOCUMENTS

2013/0200005 A1*  8/2013  Mangiacotti ......... B01D 61/145
                                                    210/741
2015/0316474 A1* 11/2015  Phillips ................ B01D 25/12
                                                    210/745

FOREIGN PATENT DOCUMENTS

| CN | 109820465 A | 5/2019 |
| CN | 111320272 A | 6/2020 |
| WO | 2019191133 A1 | 10/2019 |

OTHER PUBLICATIONS

PCT International Search Report and Written Opinion for PCT/EP2021/067373, mailed Oct. 18, 2021 (14 pages).

\* cited by examiner

*Primary Examiner* — Dirk R Bass
(74) *Attorney, Agent, or Firm* — Eversheds-Sutherland (US) LLP

(57) ABSTRACT

A bioprocessing system (100, 200) including a storage unit (102, 202) for storing a feed fluid (103, 203), a filter (106, 206) coupled to the storage unit (102, 202) via a feed path (104, 204), and a feed pump (114, 212) coupled to the feed path (104, 204). The bioprocessing system (100, 200) further includes a collection unit (102, 216) coupled to the filter (106, 206) via a downstream path (118, 218) and a turbidity sensor (134, 224) coupled to the downstream path (118, 218). Furthermore, the bioprocessing system (100, 200)

(Continued)

includes a processing unit (136, 226) configured to receive an output from the turbidity sensor (134, 224) and determine a concentration of a product in a filtration fluid (121, 222) based on the output. The processing unit (136, 226) is further configured to monitor an operating condition of the filter (106, 206) on-line based on concentration of the product.

20 Claims, 5 Drawing Sheets

300

```
┌─────────────────────────────────────────────────────────────────────┐
│ FEEDING A FEED FLUID, BY A FEED PUMP, FROM A STORAGE UNIT TO A FILTER│
│                     VIA A FEED PATH 302                              │
└─────────────────────────────────────────────────────────────────────┘
                                  ↓
┌─────────────────────────────────────────────────────────────────────┐
│     FILTERING THE FLUID BY THE FILTER TO GENERATE A FILTRATION FLUID 304 │
└─────────────────────────────────────────────────────────────────────┘
                                  ↓
┌─────────────────────────────────────────────────────────────────────┐
│   TRANSFERRING THE FILTRATION FLUID VIA A DOWNSTREAM PATH TO A       │
│                      COLLECTION UNIT 306                             │
└─────────────────────────────────────────────────────────────────────┘
                                  ↓
┌─────────────────────────────────────────────────────────────────────┐
│  DETERMINING A TURBIDITY OF THE FILTRATION FLUID BY A TURBIDITY      │
│         SENSOR COUPLED TO THE DOWNSTREAM PATH 308                    │
└─────────────────────────────────────────────────────────────────────┘
                                  ↓
┌─────────────────────────────────────────────────────────────────────┐
│ RECEIVING AN OUTPUT REPRESENTATIVE OF TURBIDITY OF THE FILTRATION    │
│    FLUID FROM THE TURBIDITY SENSOR BY A PROCESSING UNIT 310          │
└─────────────────────────────────────────────────────────────────────┘
                                  ↓
┌─────────────────────────────────────────────────────────────────────┐
│ DETERMINING A CONCENTRATION OF A PRODUCT IN THE FILTRATION FLUID,    │
│       BY THE PROCESSING UNIT, BASED ON THE OUTPUT 312                │
└─────────────────────────────────────────────────────────────────────┘
                                  ↓
┌─────────────────────────────────────────────────────────────────────┐
│ MONITORING AN OPERATING CONDITION OF THE FILTER ON-LINE, BY THE      │
│  PROCESSING UNIT, BASED ON THE ONCENTRATION OF THE PRODUCT 314       │
└─────────────────────────────────────────────────────────────────────┘
```

FIGURE 4

BIOPROCESSING SYSTEM AND ASSOCIATED METHOD THEREOF

CROSS REFERENCE TO RELATED APPLICATIONS

This application claims the priority benefit of PCT/EP2021/067373 filed Jun. 24, 2021, which claims the priority benefit to IN Application No. 202041027267 filed Jun. 26, 2020, the entire contents of which are incorporated herein by reference.

TECHNICAL FIELD

The present disclosure relates to bioprocessing systems, and more particularly, to a filter monitoring system for a bioprocessing system and an associated method for monitoring a filter in a bioprocessing system.

BACKGROUND

A vast array of businesses depends on filtration technology for filtration of fluids. Filtration systems are vital in food and beverage industries, chemical processing, paper and refining industries, and bioprocessing applications. Among other things, filtering process of a fluid is used to accomplish one or more of the following such as water purification, concentration, purification of a product solution or a suspension, and removal of contaminants (sterilization). Fine filtration of fluids typically involves use of a membrane technology for filtration purpose.

With reference to bioprocessing applications, cell culture has generated considerable interest in recent years due to the revolution in genetic engineering and biotechnology. Cells are cultured to make, for example, proteins, receptors, vaccines, and antibodies for therapy, research, and for diagnostics.

It has long been recognized that perfusion culture offers relatively good economics for cell cultures. In such an operation, cells are retained in a bioreactor, while product is continuously removed along with toxic metabolic by-products. Feed stream including nutrients, is added continually to the bioreactor. Perfusion culture operation can achieve high cell densities, and more importantly, cells can be maintained in a highly productive state for weeks. Perfusion achieves much higher yields and reduces a size of a bioreactor required. Perfusion process is also a useful technique for cultivating primary or other slow-growing cells. Perfusion process further involves fine filtration of a fluid from a bioreactor using a membrane technology for harvesting cells.

A significant operating cost factor of such a filter is the cost of membranes. If properly maintained, membranes can last for years before replacement becomes necessary. However, deposition of material on membrane surfaces may result in increased energy consumption, or membrane failure which can ultimately cause an unscheduled shutdown and significant replacement costs. Membranes are susceptible to a loss of performance because of accumulation of small particles, colloids, oil, microorganisms, and precipitated salts on their surfaces. Some of these deposits cause failure in a short period of time, while others affect membrane performance over longer periods of time. These deposits are known as scaling and fouling, or collectively referred as membrane deposition.

To prevent poor filter performance, unscheduled down time, and the premature (and expensive) replacement of membrane elements, there is a need to strive to set up an effective filter monitoring program. In one conventional example, an offline method may be used to estimate concentration of process solution(s) to monitor a filter performance. However, such a method requires multiple sampling with manual interventions. In another conventional example, a weight-based approach may be employed to estimate concentration of process solution(s). Here again, such a technique is affected by process inaccuracies and requires offline measurement for confirmation of concentration estimation. In yet another conventional example, an ultraviolet-based approach is employed to provides a qualitative estimation of concentration of process solution(s). However, such a technique has drawbacks associated with limitation due to smaller flow path, higher back-flow pressure, limitation to ultra-violet wavelength defined bands, limited smaller concentration of process solution(s), and limitation to only specific applications such as protein related applications.

Hence, there is a need for enhanced filter monitoring system and method for a bioprocessing system.

SUMMARY OF THE INVENTION

In accordance with one embodiment, a bioprocessing system is disclosed. The bioprocessing system includes a storage unit for storing a feed fluid, a filter coupled to the storage unit via a feed path, and a feed pump coupled to the feed path. The bioprocessing system further includes a collection unit coupled to the filter via a downstream path and a turbidity sensor coupled to the downstream path. The turbidity sensor is disposed downstream of the filter. Furthermore, the bioprocessing system includes a processing unit communicatively coupled to the turbidity sensor. The processing unit is configured to receive an output from the turbidity sensor and determine a concentration of a product in a filtration fluid based on the output. The processing unit is further configured to monitor an operating condition of the filter on-line based on the concentration of the product.

In accordance with another embodiment, a method for operating a bioprocessing system is disclosed. The method includes feeding a feed fluid, by a feed pump, from a storage unit to a filter via a feed path. The method further includes filtering the feed fluid by the filter to generate a filtration fluid and transferring the filtration fluid via a downstream path to a collection unit. The method also includes determining a turbidity of the filtration fluid by a turbidity sensor coupled to the downstream path and receiving an output representative of the turbidity of the filtration fluid from the turbidity sensor, by a processing unit. Furthermore, the method also includes determining a concentration of a product in the filtration fluid, by the processing unit, based on the output and monitoring an operating condition of the filter on-line, by the processing unit, based on the concentration of the product.

BRIEF DESCRIPTION OF THE FIGURES

The disclosed system and method will be described and explained with additional specificity and detail with the accompanying figures in which:

FIG. 4 is a flow chart illustrating a method for operating a bioprocessing system in accordance with an embodiment of present specification.

Figure 1:
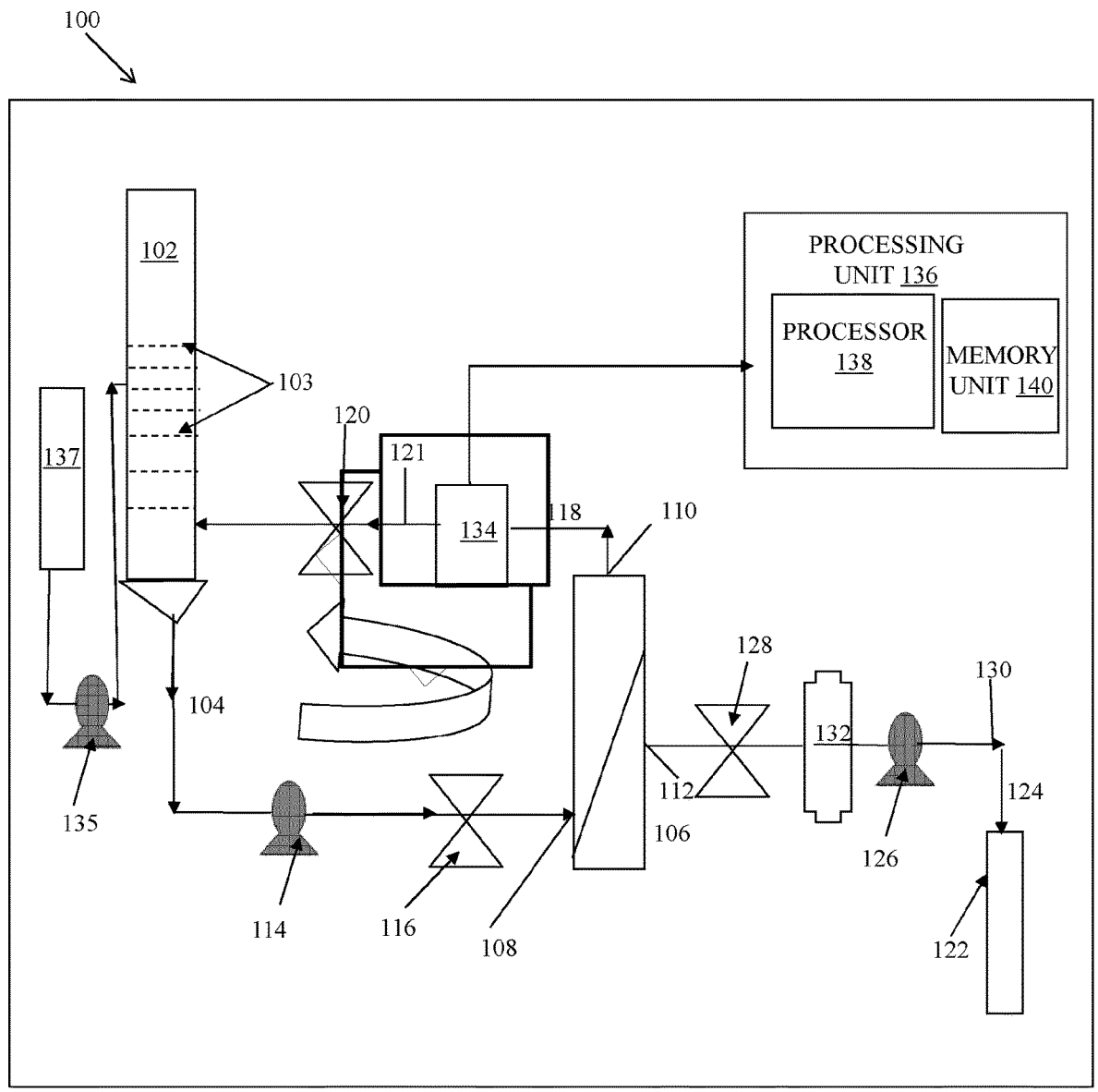
FIG. 1 is a schematic diagram of a bioprocessing system having a tangential flow filter and a turbidity sensor in accordance with an embodiment of the present specification.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION OF THE EXEMPLARY EMBODIMENTS

To promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

In accordance with one embodiment, a bioprocessing system is disclosed. The bioprocessing system includes a storage unit for storing a feed fluid, a filter coupled to the storage unit via a feed path, and a feed pump coupled to the feed path. The bioprocessing system further includes a collection unit coupled to the filter via a downstream path and a turbidity sensor coupled to the downstream path. The turbidity sensor is disposed downstream of the filter. Furthermore, the bioprocessing system includes a processing unit communicatively coupled to the turbidity sensor. The processing unit is configured to receive an output from the turbidity sensor and determine a concentration of a product in a filtration fluid based on the output. The processing unit is further configured to monitor an operating condition of the filter on-line based on the concentration of the product.

In accordance with another embodiment, a method for operating a bioprocessing system is disclosed. The exemplary system and method employ an automated on-line technique to estimate concentration of process solution(s) to monitor a filter performance. There is no need of multiple sampling and manual interventions. The exemplary system and method enable quantitative estimation of concentration of process solution(s). Further, the system and method overcome drawbacks associated with limitation due to smaller flow path, higher back-flow pressure, limitation to ultra-violet wavelength defined bands, limited smaller concentration of process solution(s), and limitation to only specific applications.

Referring to FIG. 1, a schematic diagram of a bioprocessing system 100 in accordance with an embodiment of the present specification is shown. In the illustrated embodiment, the bioprocessing system 100 includes a storage unit 102 coupled via a feed path 104 to a filter 106. In one embodiment, the storage unit 102 is used to store a feed fluid 103. In the illustrated embodiment, the filter 106 is a tangential flow filter. The filter 106 has an inlet 108, a first outlet 110, and a second outlet 112.

The bioprocessing system 10 further includes a feed pump 114 and a feed control device 116 coupled to the feed path 104. In the illustrated embodiment, the feed control device 116 may also be referred to herein as a feed control valve. Specifically, the feed control device 116 is disposed downstream of the feed pump 114 and upstream of the filter 106. The feed path 104 is coupled to the inlet 108 of the filter 106. Further, the feed pump 114 is used for feeding the feed fluid 103 at a predetermined flow rate from the storage unit 102 to the filter 106 via the feed path 104. The feed control device 116 is used for controlling a flow of the feed fluid 103 via the feed path 104 to the filter 106.

Further, the storage unit 102 is coupled to the first outlet 110 of the filter 106 via a downstream path 118. In illustrated embodiment, the storage unit 102 may also be referred to as a "collection unit" and the downstream path 118 may also be referred to as a "retentate path". A retentate control device 120 is coupled to the downstream path 118. The retentate control device 120 may also be referred to herein as a "retentate control valve". Specifically, the second retentate control device 120 is used to control a flow of a filtration fluid 121 through the downstream path 118 to the storage unit 102. In the illustrated embodiment, the filtration fluid 121 may also be referred to as a retentate fluid. The filter 106 is used for separating the filtration fluid 121 from the feed fluid 103 by utilizing a pressure difference across the filter 106.

Additionally, a receiving unit 122 is coupled to the second outlet 112 of the filter 106 via a permeate path 124. The bioprocessing system 100 also includes a permeate pump 126 coupled to the permeate path 124. Also, the bioprocessing system 100 includes a permeate control device 128 coupled to the permeate path 124 and disposed upstream of the permeate pump 126. The permeate control device 128 may also be referred to herein as a "permeate control valve". The filter 106 is used for separating a permeate fluid 130 from the feed fluid 103 by utilizing a pressure difference across the filter 106. The permeate pump 126 can be operated to feed the permeate fluid 130 at a predetermined flow rate to the receiving unit 122 via the permeate path 124. The permeate control device 128 is used to control the flow of the permeate fluid 130 via the permeate path 124 to the receiving unit 122. In the illustrated embodiment, the bioprocessing system 100 further includes a flow meter 132 coupled to the permeate path 124. Specifically, the flow meter 132 is disposed downstream of the permeate control device 128 and upstream of the permeate pump 126. The permeate flow meter 132 is used to measure a flow rate of the permeate fluid 130 flowing through the permeate flow path 124. In one embodiment, the permeate flow meter 132 may output a signal representative of the flow rate of the permeate fluid 130 flowing through the permeate flow path 124. In another embodiment, the permeate flow meter 132 may output a signal representative of a parameter, for example, volume or velocity, of the permeate fluid 130 for computing the flow rate of the permeate fluid 130. Any type of flow sensor which may be used for measuring the flow rate of the permeate fluid 130 is envisioned.

It should be noted herein that the illustrated bioprocessing system 100 is an exemplary embodiment and should not be construed as a limitation. The configuration of the bioprocessing system 100 may vary depending upon the application. In other embodiments, the number of filters and valves may vary depending on the application and process requirements.

In another embodiment, instead of using the feed pump 114, a pressurized gas may be fed from a gas source (not shown) to the storage unit 102 via a filter (not shown) for feeding the feed fluid 103 from the storage unit 102 to the filter 106 via the feed path 104. In such an embodiment, the permeate pump 126 may not be required.

As discussed earlier, deposition of material on membrane surfaces of a filter may result in increased energy consumption, or membrane failure which can ultimately cause an unscheduled shutdown and significant replacement costs. Membranes are susceptible to a loss of performance because of accumulation of small particles, colloids, oil, microorganisms, and precipitated salts on their surfaces. Some of these deposits cause failure of a filter in a short period of time, while others affect membrane performance over longer periods of time. Hence, there is a need to monitor the performance of a filter.

In the illustrated embodiment, the bioprocessing system 100 further includes a turbidity sensor 134 coupled to the downstream path 118. Specifically, the turbidity sensor 134 is located downstream of the filter 106 and upstream of the retentate control device 120. The turbidity sensor 134 is used to detect a turbidity of the filtration fluid 121. Turbidity is a property generated due to a result of particles of solid matter being suspended in a fluid. Further, a processing unit 136 is communicatively coupled to the turbidity sensor 134. The processing unit 136 is configured to receive an output from the turbidity sensor 134 and determine a concentration of a product in the filtration fluid 121 based on the output. It should be noted herein the concentration of the product in the filtration fluid 121 is dependent on the turbidity of the filtration fluid 121. The processing unit 136 is further configured to monitor an operating condition of the filter 106 on-line based on the concentration of the product. Specifically, the processing unit 136 is configured to determine a repair condition or replacement condition of the filter 106 based on the concentration of the product. In one embodiment, the processing unit 136 is configured to determine a repair condition or replacement condition of the filter 106 if the concentration of the product is less than a threshold concentration.

In one embodiment, the bioprocessing system 100 is a bioprocessing perfusion system. In such an embodiment, the storage unit 102 and the collection unit are same. The storage unit storage unit 102 and the collection unit form a bioreactor. The storage unit 102 is used for storage of a feed fluid 103 associated with cell culture, for example. In one specific embodiment, the filter 106 is an ultrafiltration type filter. The filtration fluid 121 is a retentate fluid including but not limited to the product having one of cells, cell debris, proteins, aggregated proteins, nucleic acids, and virus particles. In the illustrated embodiment, a transfer pump 135 may be used in washing and diafiltration applications to add a liquid (usually buffer) from a source unit 137 to the storage unit 102 at a predefined controlled rate.

Further, in the illustrated embodiment, the processing unit 136 includes a processor 138 and a memory unit 140 coupled to the processor 138. In some embodiments, the processing unit 136 is used to control at least one function of the bioprocessing system 100. In certain embodiments, the processing unit 136 may include more than one processor co-operatively working with each other for performing intended functionalities. The processing unit 136 is further configured to store and retrieve contents into and from the memory unit 140. In one embodiment, the processing unit 136 is configured to initiate and control the functionality of the bioprocessing system 100 using artificial intelligence and/or machine learning algorithms.

In one embodiment, the processor 138 includes at least one of a general-purpose computer, a graphics processing unit (GPU), a digital signal processor, and a controller. In some embodiments, the processor 138 may be implemented as one or more microprocessors, microcomputers, microcontrollers, digital signal processors, central processing units, state machines, logic circuitries, and/or any device that manipulates signals based on operational instructions. Among other capabilities, the at least one processor is configured to fetch and execute computer-readable instructions stored in the memory. In other embodiments, the processor 138 includes a customized processor element such as, but not limited to, an application-specific integrated circuit (ASIC) and a field-programmable gate array (FPGA). In some embodiments, the processor 138 may be communicatively coupled with at least one of a keyboard, a mouse, and any other input device and configured to receive commands and/or parameters from an operator via a console.

In one embodiment, the memory unit 140 is a random-access memory (RAM), a read only memory (ROM), a flash memory, or any other type of computer readable memory accessible by the processor 138. In some embodiments, the memory unit 140 may include, for example, volatile memory such as static random access memory (SRAM) and/or dynamic random access memory (DRAM) and/or non-volatile memory such as read only memory (ROM), erasable programmable ROM, flash memories, hard disks, optical disks, and/or magnetic tapes. Also, in certain embodiments, the memory unit 140 may be a non-transitory computer readable medium encoded with a program having a plurality of instructions to instruct the processor 138 to perform a sequence of steps to operate bioprocessing system 100.

In certain embodiments, the processing unit 136 may include an I/O interface having a variety of client application and hardware interfaces, for example, a web interface, a graphical user interface, and the like. The I/0 interface may allow the processing unit 136 to interact with a customer directly or through customer devices. Further, the I/O interface may enable the processing unit 136 to communicate with other computing devices such as web servers and external data servers (not shown). The I/O interface may facilitate multiple communications within a wide variety of networks and protocol types, including wired networks such as Local Area Network, cable, etc., and wireless networks such as Wireless Local Area Network, cellular, satellite, etc. The I/O interface may include one or more ports for connecting a plurality of devices to each other and/or to another server.

In one embodiment, the processing unit 136 is communicatively coupled to the permeate flow meter 132. In one embodiment, the processing unit 136 is configured to receive the output signal representative of the flow rate of the permeate fluid 130 from the permeate flow meter 132. In another embodiment, the processing unit 136 is configured to receive the output signal representative of a parameter, for example, volume or velocity, of the permeate fluid 130 from the permeate flow meter 132 for computing the flow rate of the permeate fluid 130 in accordance with a known technique.

In some embodiments, the processing unit 136 can also communicatively coupled to the feed pump 114 and the permeate pump 126. The processing unit 136 is further configured to control the feed pump 114 and the permeate pump 126. Furthermore, the processing unit 136 can also be coupled to and configured to control operations of the feed control device 116, the permeate control device 128, and the retentate control device 120. In one embodiment, the processing unit 136 is configured to control the feed flow control device 116 for controlling a flow of the feed fluid 103 from the storage unit 102 to the filter 106 via the feed path 104. Further, the processing unit 136 is configured to control the retentate control device 120 and the permeate control device 128 for controlling a flow of the filtration fluid 121 and the permeate fluid 130 through the downstream path 118 and the permeate path 124 respectively.

Figure 2:
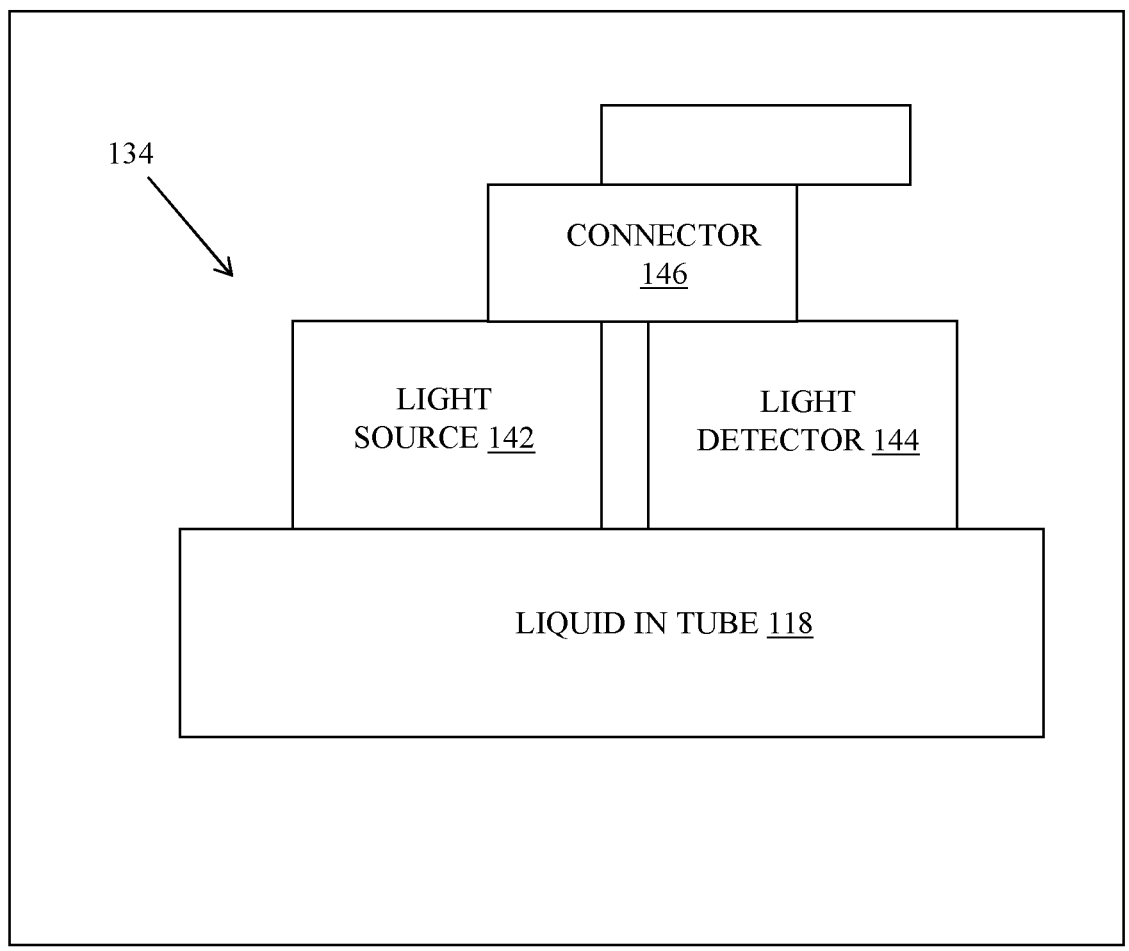
FIG. 2 is a schematic diagram of a turbidity sensor coupled to a downstream path of the bioprocessing system in accordance with an embodiment of FIG. 1.

FIG. 2 is a schematic diagram of the turbidity sensor 134 coupled to the downstream path 118 in accordance with an embodiment of FIG. 1. The turbidity sensor 134 includes a light source 142 and a light detector 144 coupled to the downstream path 118. The processing unit 136 is coupled via a connector 146 to the turbidity sensor 134. In another embodiment, the processing unit 136 is communicatively coupled to the turbidity sensor 134. Specifically, the turbidity sensor 134 is located downstream of the filter 106 and upstream of the retentate control device 120. The turbidity sensor 134 is used to detect a turbidity of the filtration fluid 121. The light source 142 is used to generate and focus a light beam to the filtration fluid 121. The light beam will then be scattered by any product particles of the filtration fluid 121. The light detector 144 is used to detect the scattered light beam. In one embodiment, the light detector 144 is located at a predefined angle, for example, approximately 90-degree angle with reference to the light source 142. In another embodiment, the light detector 144 is located at 180-degree to the light source 142. In other embodiments, the angle of light detector 144 may vary depending on the application. In certain other embodiments, a plurality of light detectors 144 may be used to detect the scattered light beam. Such detectors 144 may be placed at predefined angles with reference to the light source 142. The predefined angle is determined based on of a type of the filtration fluid 121 and a type of the product for which the concentration is to be determined. It should be noted herein that the scattered light beam is indicative of the turbidity of the filtration fluid 121. If the turbidity of the filtration fluid 121 is greater, the scattering of the light beam is also increased and vice versa. The amount of scattering of the light beam is used to determine the concentration of the product (i.e. particle density) within the filtration fluid 121. Hence, if more scattering of light beam is detected, the particles of the product present in the filtration fluid 121 is greater and vice versa. It should be noted herein that the turbidity response increases with increase in particle diameter and hence larger particles are easier to detect based on the turbidity of the filtration fluid 121. As noted earlier, the filtration fluid 121 is a retentate fluid including but not limited to the product having one of cells, cell debris, proteins, aggregated proteins, nucleic acids, and virus particles.

It should be noted herein that in case of larger particles, absolute size, shape, and structure of the influence the scattering effects of a light beam. In the case of smaller particles, uniform scattering occurs along all directions. Larger particles perform an unsymmetrical distribution of scattered light including back and forward scattering.

Specifically, the processing unit 136 is configured to receive an output from the turbidity sensor 134 and determine a concentration of a product in the filtration fluid 121 based on the sensor output. The processing unit 136 is further configured to monitor an operating condition of the filter 106 on-line based on the concentration of the product. Specifically, the processing unit 136 is configured to determine a repair condition or replacement condition of the filter 106 based on the concentration of the product. In the illustrated embodiment, the processing unit 136 is configured to determine a repair condition or replacement condition of the filter 106 if the concentration of the product is less than a threshold concentration. In certain embodiments, the processing unit 136 is further configured to control a wavelength of the light beam generated by the light source 142 based on at least one of a type of the filtration fluid 121 and the type of product for which the concentration is to be determined.

It should be noted herein that variability in measurements caused by instability in light sources, high particle densities, or colour can be reduced using multiple detectors at different angles. Such "ratiometric" instruments compute the turbidity value using a ratio of the light received by the different detectors. Furthermore, the absorption of light by coloured particles or coloured matrix can cause a reduction in the apparent turbidity. The negative effect due to colour is minimized by using near-infrared light frequencies as the light source or by ratiometric techniques.

In one embodiment, for very small particles (for example, particle size of 40 nm, e.g., protein molecules), a high sensitivity can be achieved by locating the scattered light detector at an angle of 90 degrees, for example with reference to the light source. This is often combined with a transmitted light detector to compensate for any light absorption by a sample, where a ratio of scattered to transmitted light is calculated. Such an arrangement can be used when the sample includes light-absorbing small molecule components, for example, dyes such as methyl red used in cell culture media.

In some embodiments, larger particles (for example, cell debris, viruses) scatter more light at smaller angles, for example, 11 degrees, which can be used for high sensitivity measurements. For higher particle concentrations, the scattering intensity would be diminished by multiple scatterings of light beam. In such a scenario, it is preferable to measure backward scattering of light by a detector located at an angle of 180 degrees with reference to the light source.

In certain embodiments, the wavelength of light beam used for turbidity measurement is often in the visual or near infrared range, for example, 660 nm or in a range of 780-900 nm. For small particles, smaller wavelength is preferable.

Figure 3:
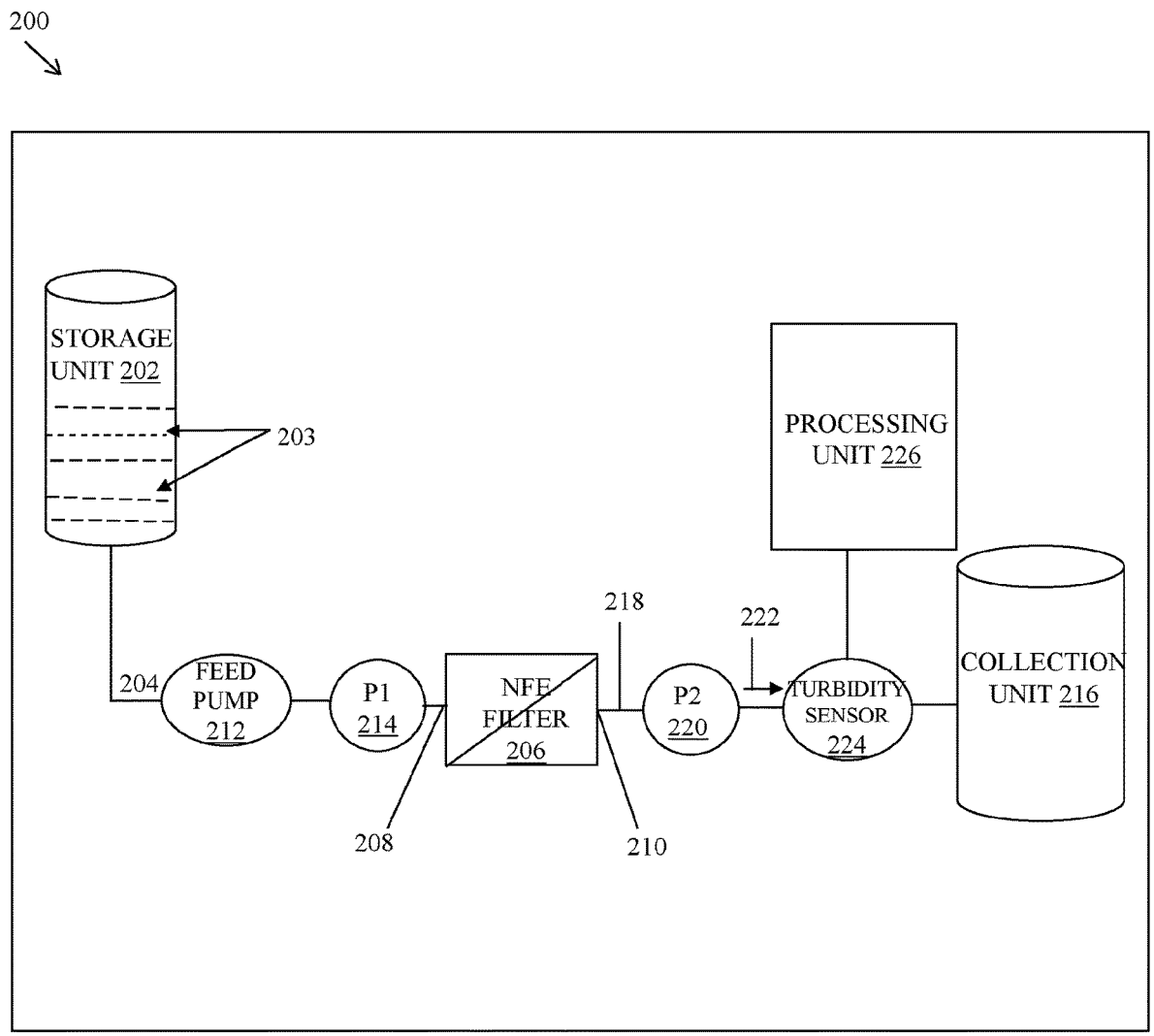
FIG. 3 a schematic diagram of a bioprocessing system having a normal flow filter and a turbidity sensor in accordance with another embodiment of the present specification.

Referring to FIG. 3, a schematic diagram of a bioprocessing system 200 in accordance with an embodiment of the present specification is shown. In the illustrated embodiment, the bioprocessing system 200 includes a storage unit 202 coupled via a feed path 204 to a filter 206. In one embodiment, the storage unit 202 is used to store a feed fluid 203. In the illustrated embodiment, the filter 206 is a normal flow filter. The filter 206 has an inlet 208 and an outlet 210.

The bioprocessing system 200 further includes a first feed pump 212 and a second feed pump 214 coupled to the feed path 204. Although two feed pumps 212, 214 are shown herein, in other embodiments, the number of feed pumps may vary depending on the application. In one embodiment, a feed control device (not shown in FIG. 3) may be optionally coupled to the feed path 204 and disposed downstream of the feed pumps 212, 214. The feed path 204 is coupled to the inlet 208 of the filter 206. Further, the feed pumps 212, 214 are used for feeding the feed fluid 203 at a predetermined flow rate from the storage unit 202 to the filter 206 via the feed path 204.

Further, a collection unit 216 is coupled to an outlet 210 of the filter 206 via a downstream path 218 (may also be referred to as a "permeate path"). The bioprocessing system 200 also includes a permeate pump 220 coupled to the downstream path 218. Also, the bioprocessing system 200 may include a permeate control device (not shown in FIG. 3) optionally coupled to the downstream path 218 and disposed upstream of the permeate pump 220. The filter 206 is used for separating a filtration fluid 222 from the feed fluid 203. The permeate pump 220 can be operated to feed the filtration fluid 222 at a predetermined flow rate to the collection unit 216 via the downstream path 218.

It should be noted herein that the illustrated bioprocessing system 200 is an exemplary embodiment and should not be construed as a limitation. The configuration of the bioprocessing system 200 may vary depending upon the application. In other embodiments, the number of filters, pumps, and valves may vary depending on the application and process requirements.

In the illustrated embodiment, the bioprocessing system 200 further includes a turbidity sensor 224 coupled to the downstream path 218. Specifically, the turbidity sensor 224 is located downstream of the filter 206 and the permeate pump 220. The turbidity sensor 224 is used to detect a turbidity of the filtration fluid 222. Further, a processing unit 226 is communicatively coupled to the turbidity sensor 224. The processing unit 226 is configured to receive an output from the turbidity sensor 224 and determine a concentration of a product in the filtration fluid 222 based on the output. The processing unit 226 is further configured to monitor an operating condition of the filter 206 on-line based on the concentration of the product. Specifically, the processing unit 226 is configured to determine a repair condition or replacement condition of the filter 206 based on the concentration of the product. In one embodiment, the processing unit 226 is configured to determine a repair condition or replacement condition of the filter 206 if the concentration of the product is greater than a threshold concentration.

In one embodiment, the processing unit 226 is configured to initiate and control the functionality of the bioprocessing system 200. In some embodiments, the processing unit 226 can also communicatively coupled to the first and second feed pumps 212, 214 and the permeate pump 220. The processing unit 226 is further configured to control the first and second feed pumps 212, 214 and the permeate pump 220. Furthermore, the processing unit 226 can also be coupled to and configured to control operations of the feed control device and the permeate control device. In one embodiment, the processing unit 226 is configured to control the feed flow control device for controlling a flow of the feed fluid 203 from the storage unit 202 to the filter 206 via the feed path 204. Further, the processing unit 226 is configured to control the permeate control device for controlling a flow of the filtration fluid 222 through the downstream path 218.

FIG. 4 is a flow chart illustrating a method 300 for operating a bioprocessing system in accordance with an embodiment of present specification. The method 300 includes feeding the feed fluid, by the feed pump, from a storage unit to a filter via a feed path as represented by step 302. In one embodiment, the processing unit operates the feed pump and opens the feed control device to control the flow of the feed fluid from the storage unit to the filter via the feed path. The method 300 further includes filtering the feed fluid by the filter to generate a filtration fluid as represented by step 304. The method 300 also includes transferring the filtration fluid via the downstream path to the collection unit as represented by step 306.

In one embodiment, the step of filtering the feed fluid includes filtering the feed fluid by a normal flow filter. In another embodiment, the bioprocessing system is a bioprocessing perfusion system and the step of filtering the feed fluid includes filtering the feed fluid by a tangential flow filter. In such an embodiment, the filtration fluid from the feed fluid is transferred via the downstream path (retentate path) to the collection unit, wherein the filtration fluid is a retentate fluid. In the same embodiment, the storage unit and the collection unit are same and form a bioreactor. In one example, the filtration fluid is a retentate fluid including the product having but not limited to cells, cell debris, proteins, aggregated proteins, nucleic acids, and virus particles Furthermore, in such an embodiment, a permeate fluid from the feed fluid is transferred from the filter to the receiving unit, by the permeate pump, via the permeate path. In some embodiments, the processing unit may operate the permeate pump and open the permeate control device to feed the permeate fluid to the receiving unit via the permeate path. Further, the control unit may open the retentate control device to feed the filtration fluid through the downstream path to the collection unit.

Furthermore, the method 300 includes determining a turbidity of the filtration fluid by a turbidity sensor coupled to the downstream path as represented by the step 308. The light source of the turbidity sensor generates and focuses a light beam to the filtration fluid. The light beam will then be scattered by any product particles of the filtration fluid. The light detector of the turbidity sensor detects the scattered light beam. In certain other embodiments, a plurality of light detectors detects the scattered light beam. In one embodiment, the processing unit controls a wavelength of a light beam generated by the light source of the turbidity sensor, based on at least one of a type of the filtration fluid and a type of the product for which the concentration is to be determined.

Figure 5:
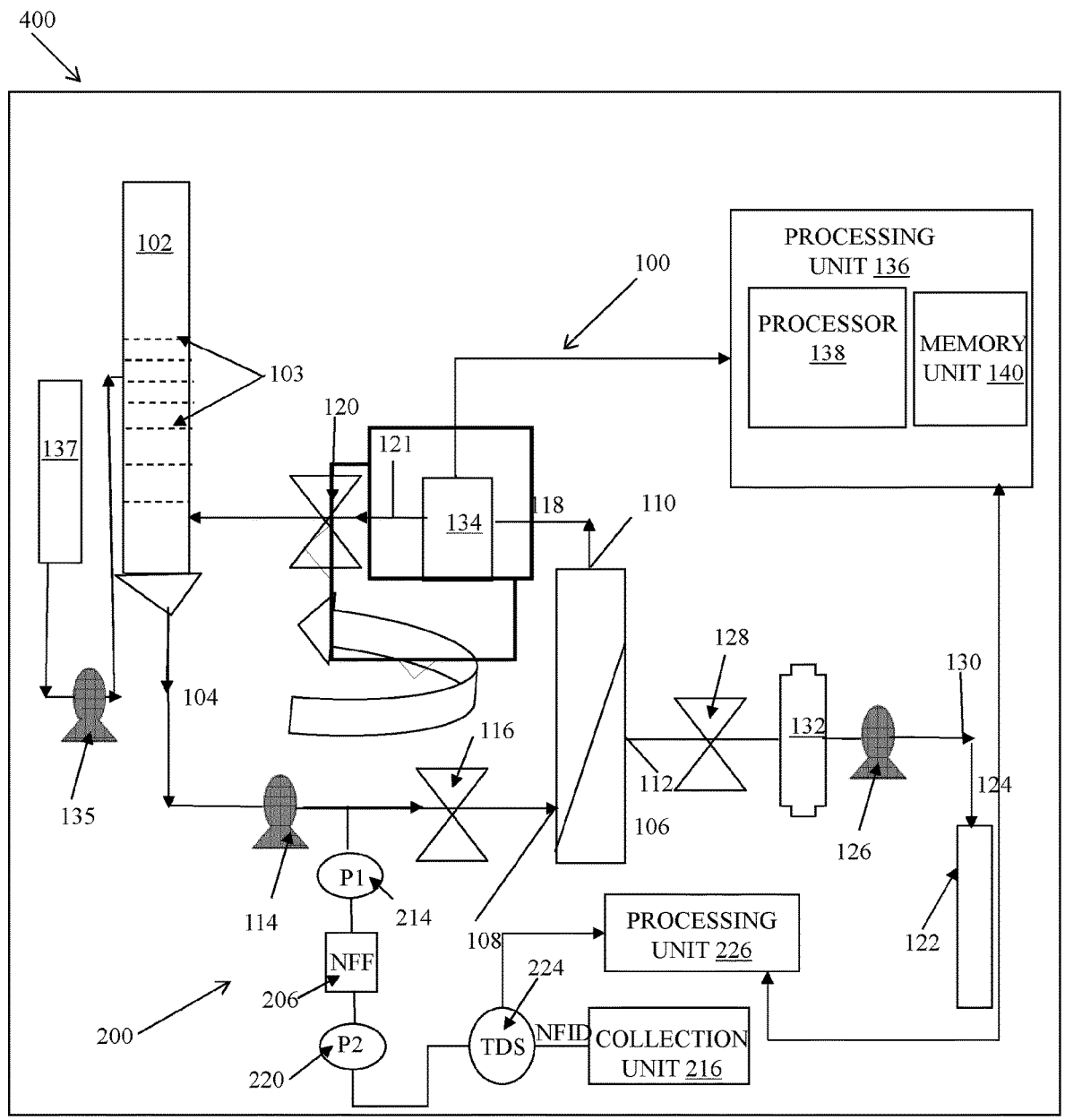
FIG. 5 is a schematic representation of a bioprocessing system in accordance with embodiments of FIGS. 1 and 2.

Furthermore, the method 300 includes receiving an output representative of the turbidity of the filtration fluid from the turbidity sensor, by the processing unit as represented by the step 310. As noted earlier, the scattered light beam is indicative of the turbidity of the filtration fluid 121. If the turbidity of the filtration fluid 121 is greater, the scattering of the light beam is also increased and vice versa. The amount of scattering of the light beam is used to determine the concentration of the product (i.e. particle density) within the filtration fluid. Specifically, the method 300 includes determining a concentration of a product in the filtration fluid, by the processing unit, based on the sensor output as represented by step 312. Additionally, the method 300 includes monitoring an operating condition of the filter on-line, by the processing unit, based on the concentration of the product as represented by step 314. Specifically, the processing unit is configured to determine a repair condition or replacement condition of the filter based on the concentration of the product. In one embodiment, if the filter is a normal flow filter, the processing unit is used to determine a repair condition or replacement condition of the filter if the concentration of the product is greater than a threshold concentration. If the filter is a tangential flow filter, the processing unit is used to determine a repair condition or a replacement condition of the filter if the concentration of the product is less than a threshold concentration FIG. 5 shows a schematic representation of a bioprocessing system 400 in accordance with embodiments of FIGS. 1 and 2. The bioprocessing system 400 includes a combination of the bioprocessing systems 100, 200. In the illustrated embodiment, the feed path 204 is coupled to the feed path 104. Either the filter 106 or filter 206 may be operated depending on the application. Feed control devices may be controlled to direct the feed fluid either to the filter 106 or the filter 206. The processing units 136, 226 may be coupled to each other or a single integrated processing unit may be used to monitor an operating condition of the filters 106, 206 on-line based on the concentration of the product in the filtration fluid.

In accordance with the exemplary system and method discussed herein facilitates to provides an automated direct quantitative concentration measurement of a product in a filtration fluid. The exemplary technique using turbidity sensor enables application for flow paths having greater length (for example, up to 65 mm), thereby permitting process scale-up. The exemplary technique is also suitable for applications involving higher concentration of the filtration fluid. Furthermore, the exemplary technique is suitable for wide range of applications involving different filtration fluids and different types of product for which the concentration is to be determined.

We claim:

1. A bioprocessing perfusion system comprising:
a storage unit for storing a feed fluid;
a filter coupled to the storage unit via a feed path;
a feed pump coupled to the feed path;
a collection unit coupled to the filter via a downstream path;
a turbidity sensor coupled to the downstream path, wherein the turbidity sensor is disposed downstream of the filter; and
a processing unit communicatively coupled to the turbidity sensor, wherein the processing unit is configured to receive an output from the turbidity sensor and determine a concentration of a product in a filtration fluid based on the output, and wherein the processing unit is further configured to monitor an operating condition of the filter on-line based on the concentration of the product,
wherein the turbidity sensor comprises a light source, and wherein the processing unit is further configured to control a wavelength of a light beam generated by the light source based on at least one of a type of the filtration fluid and a type of the product for which the concentration is to be determined, and
wherein the turbidity sensor comprises a light detector located at a predefined angle relative to the light source, wherein the predefined angle is determined based on of a type of the filtration fluid and a type of the product for which the concentration is to be determined.

2. The bioprocessing system as claimed in claim 1, wherein the filter is a normal flow filter.

3. The bioprocessing system as claimed in claim 1, wherein the processing unit is configured to determine the operating condition comprising a repair condition or a replacement condition of the filter if the concentration of the product is greater than a threshold concentration.

4. The bioprocessing system as claimed in claim 1, wherein the filter is a tangential flow filter.

5. The bioprocessing system as claimed in claim 1, wherein the downstream path is a retentate path, and wherein the filtration fluid is a retentate fluid comprising the product having one of cells, cell debris, proteins, aggregated proteins, nucleic acids, and virus particles.

6. The bioprocessing system as claimed in claim 1, further comprising:
a receiving unit coupled to the filter via a permeate path; and
a permeate pump coupled to the permeate path.

7. The bioprocessing system as claimed in claim 5, wherein the processing unit is configured to determine the operating condition comprising a repair condition or a replacement condition of the filter if the concentration of the product is less than a threshold concentration.

8. The bioprocessing system as claimed in claim 4, wherein the tangential flow filter is an ultrafiltration type filter.

9. The bioprocessing system as claimed in claim 1, wherein the bioprocessing system is a bioprocessing perfusion system.

10. The bioprocessing system as claimed in claim 1, wherein the storage unit and the collection unit are same, and wherein the storage unit and the collection unit form a bioreactor.

11. A method for operating a bioprocessing perfusion system, the method comprising:
feeding a feed fluid, by a feed pump, from a storage unit to a filter via a feed path;
filtering the feed fluid by the filter to generate a filtration fluid;
transferring the filtration fluid via a downstream path to a collection unit;
determining a turbidity of the filtration fluid by a turbidity sensor coupled to the downstream path, wherein the turbidity sensor is disposed downstream of the filter;
receiving an output representative of the turbidity of the filtration fluid from the turbidity sensor, by a processing unit;
determining a concentration of a product in the filtration fluid, by the processing unit, based on the output, and monitoring an operating condition of the filter on-line, by the processing unit, based on the concentration of the product, wherein the turbidity sensor comprises a light source, and wherein the processing unit is further configured to control a wavelength of a light beam generated by the light source based on at least one of a type of the filtration fluid and a type of the product for which the concentration is to be determined, and wherein the turbidity sensor comprises a light detector located at a predefined angle relative to the light source, wherein the predefined angle is determined based on of a type of the filtration fluid and a type of the product for which the concentration is to be determined.

12. The method as claimed in claim 11, wherein filtering the feed fluid by the filter comprises filtering the feed fluid by a normal flow filter.

13. The method as claimed in claim 11, wherein monitoring the operating condition of the filter on-line comprises determining the operating condition comprising a repair condition or a replacement condition of the filter if the concentration of the product is greater than a threshold concentration.

14. The method as claimed in claim 11, wherein filtering the feed fluid by the filter comprises filtering the feed fluid by a tangential flow filter.

15. The method as claimed in claim 11, wherein transferring the filtration fluid via the downstream path to the collection unit comprises transferring the filtration fluid via a retentate path to the collection unit, wherein the filtration fluid is a retentate fluid comprising the product having of cells, cell debris, proteins, aggregated proteins, nucleic acids, and virus particles.

16. The method as claimed in claim 11, further comprising:
transferring a permeate fluid from the filter to a receiving unit, by a permeate pump, via a permeate path.

17. The method as claimed in claim 15, wherein monitoring the operating condition of the filter on-line comprises determining the operating condition comprising a repair condition or a replacement condition of the filter if the concentration of the product is less than a threshold concentration.

18. The method as claimed in claim 11, wherein operating the bioprocessing system comprises operating a bioprocessing perfusion system.

19. The method as claimed in claim 11, wherein the storage unit and the collection unit are same, and wherein the storage unit and the collection unit form a bioreactor.

20. The method as claimed in claim 11, further comprising controlling the wavelength of the light beam generated by the light source of the turbidity sensor, by the processing unit, based on at least one of the type of the filtration fluid and the type of the product for which the concentration is to be determined.

* * * * *